(12) United States Patent
Kagotani et al.

(10) Patent No.: US 11,893,432 B2
(45) Date of Patent: Feb. 6, 2024

(54) AUTHENTICATION MEDIUM, AUTHENTICATION MEDIUM MANUFACTURING METHOD, AUTHENTICATION MEDIUM READING METHOD, AND AUTHENTICATION MEDIUM VERIFICATION METHOD

(71) Applicant: TOPPAN PRINTING CO., LTD., Tokyo (JP)

(72) Inventors: Akihito Kagotani, Tokyo (JP); Soko Koda, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 478 days.

(21) Appl. No.: 17/135,563

(22) Filed: Dec. 28, 2020

(65) Prior Publication Data

US 2021/0150296 A1    May 20, 2021

Related U.S. Application Data

(63) Continuation of application No. PCT/JP2019/025868, filed on Jun. 28, 2019.

(30) Foreign Application Priority Data

Jun. 29, 2018 (JP) ................. 2018-124211
Oct. 30, 2018 (JP) ................. 2018-204306

(51) Int. Cl.
*G06K 19/06* (2006.01)
*B42D 25/328* (2014.01)
(Continued)

(52) U.S. Cl.
CPC ..... *G06K 19/06065* (2013.01); *B42D 25/328* (2014.10); *B42D 25/485* (2014.10);
(Continued)

(58) Field of Classification Search
CPC .. G06K 19/06065; G06K 19/02; G06K 19/06; B42D 25/328; B42D 25/485;
(Continued)

(56) References Cited

U.S. PATENT DOCUMENTS 4,822,973 A    4/1989  Fahner et al.
5,513,019 A *  4/1996  Cueli ................... B42D 25/328
                                                        359/2

(Continued)

FOREIGN PATENT DOCUMENTS

CA    2546830 A1 *  4/2007  ............ B42D 25/00
CN    1268725 A     10/2000
(Continued)

OTHER PUBLICATIONS

Extended European Search Report dated Aug. 2, 2021, in corresponding European Application No. 19824724.9.
(Continued)

*Primary Examiner* — Tuyen K Vo
(74) *Attorney, Agent, or Firm* — Foley & Lardner LLP

(57) ABSTRACT

An authentication medium includes a sheet-like laminate sheet; a first region that is formed on the laminate sheet and where personal identification information is recorded; and a second region that is formed on the laminate sheet and has a hologram structure where check data associated with first individual information is recorded.

14 Claims, 13 Drawing Sheets

(51) Int. Cl.
*G06K 19/02* (2006.01)
*G03H 1/26* (2006.01)
*G03H 1/00* (2006.01)
*B42D 25/485* (2014.01)
*B42D 25/23* (2014.01)
*B42D 25/24* (2014.01)

(52) U.S. Cl.
CPC ........... *G03H 1/0011* (2013.01); *G03H 1/265* (2013.01); *G06K 19/02* (2013.01); *B42D 25/23* (2014.10); *B42D 25/24* (2014.10); *G03H 2001/266* (2013.01); *G03H 2210/20* (2013.01); *G03H 2210/52* (2013.01)

(58) Field of Classification Search
CPC ........ B42D 25/23; B42D 25/24; B42D 13/00; B42D 25/305; B42D 25/455; B42D 25/46; G03H 1/0011; G03H 1/265; G03H 2001/266; G03H 2210/20; G03H 2210/52; G03H 1/0248; G03H 1/0244; G03H 2001/0016; G03H 2001/0497; G03H 2250/10; G03H 2250/42; G03H 2270/52; G07D 7/12
See application file for complete search history.

(56) References Cited

U.S. PATENT DOCUMENTS

| | | | | |
|---|---|---|---|---|
| 6,527,173 | B1 * | 3/2003 | Narusawa | G06K 19/16 235/382 |
| 2003/0232903 | A1 | 12/2003 | Sato et al. | |
| 2004/0076803 | A1 * | 4/2004 | Jaynes | B32B 27/304 428/209 |
| 2004/0201873 | A1 * | 10/2004 | Erickson | G11B 23/283 |
| 2006/0236115 | A1 * | 10/2006 | Haneda | G06K 19/16 713/182 |
| 2006/0262366 | A1 | 11/2006 | D'Amato et al. | |
| 2007/0186116 | A1 * | 8/2007 | Clemmensen | G06F 21/34 713/186 |
| 2007/0288757 | A1 * | 12/2007 | Tsukagoshi | G07C 9/37 |
| 2008/0037087 | A1 * | 2/2008 | Sugita | G11B 7/007 359/24 |
| 2009/0147333 | A1 * | 6/2009 | Yamatsu | G11B 7/0065 355/2 |
| 2009/0315318 | A1 * | 12/2009 | Jones | B42D 25/382 283/85 |
| 2010/0202028 | A1 * | 8/2010 | Menz | B42D 25/328 430/5 |
| 2012/0212789 | A1 * | 8/2012 | Shirakura | G03H 1/268 359/2 |
| 2015/0129780 | A1 * | 5/2015 | Le Loarer | B42D 25/29 250/226 |
| 2015/0353485 | A1 | 12/2015 | Hagen et al. | |
| 2019/0272456 | A1 * | 9/2019 | Roach | H01L 25/0753 |

FOREIGN PATENT DOCUMENTS

| | | |
|---|---|---|
| EP | 2 886 362 A | 6/2015 |
| GB | 2 452 066 A | 2/2009 |
| JP | H06-67592 A | 3/1994 |
| JP | H07-40690 A | 2/1995 |
| JP | 3198324 B2 | 8/2001 |
| JP | 2003-150918 A | 5/2003 |
| JP | 2004-018642 A | 1/2004 |
| JP | 2007-069473 A | 3/2007 |
| JP | 4677683 B2 | 4/2011 |
| WO | WO-2011/045972 A1 | 4/2011 |
| WO | WO-2014/114582 A2 | 7/2014 |

OTHER PUBLICATIONS

International Searching Authority, "International Search Report," issued in connection with International Patent Application No. PCT/JP2019/025868, dated Sep. 10, 2019.

International Searching Authority, "Written Opinion," issued in connection with International Patent Application No. PCT/JP2019/025868, dated Sep. 10, 2019.

Office Action dated Dec. 29, 2021 issued in a corresponding Chinese Patent Application No. 201980044086.9, (16 pages).

* cited by examiner

AUTHENTICATION MEDIUM, AUTHENTICATION MEDIUM MANUFACTURING METHOD, AUTHENTICATION MEDIUM READING METHOD, AND AUTHENTICATION MEDIUM VERIFICATION METHOD

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/025868, filed on Jun. 28, 2019, which is based upon and claims the benefit of priority to Japanese Patent Application No. 2018-124211, filed on Jun. 29, 2018 and Japanese Patent Application No. 2018-204306, filed on Oct. 30, 2018, the disclosures of which are incorporated herein by reference in their entireties.

TECHNICAL FIELD

Embodiments of the present invention relate to an authentication medium, an authentication medium manufacturing method, an authentication medium reading method, and an authentication medium verification method.

BACKGROUND ART

As authentication media containing personal information, various identification (ID) cards such as passports and driver's licenses are known. Most ID cards have facial images and character information displayed thereon to visually identify personal information. However, personal information simply printed on an authentication medium is vulnerable to tampering and counterfeiting.

As a method of preventing counterfeiting of authentication media, PTL 1 describes that the anti-tampering property of an authentication medium is improved by transferring a hologram foil to the authentication medium.

PTL 2 describes the addition of personal information using a fluorescent light-emitting material such that the personal information is transparent and cannot be visually recognized when observed under visible light but can be visually recognized under ultraviolet observation.

The anti-counterfeiting technique described in PTL 1 is already well known and will permit easy counterfeiting of holograms emitting simple iridescent diffraction light.

PTL 3 describes, as another anti-counterfeiting method, performing authenticity verification using reproduction information displayed on a hologram by irradiating the hologram with light of a specific wavelength.

[Citation List][Patent Literatures] [PTL 1] JP-A-H6-67592; [PTL 2] JP-B-3198324; [PTL 3] JP-B-4677683.

SUMMARY OF THE INVENTION

Technical Problem

In the technique described in PTL 3, the reproduction information is preset and invariant. Thus, once a counterfeiter knows the reproduction information, they may produce a hologram imitating the reproduction information, so that this technique has still room for improvement.

Under the foregoing circumstances, embodiments of the present invention aim to provide an authentication medium that helps deter tampering and counterfeiting, using a simple configuration, and a technique related to verification.

Solution to Problem

The embodiments of the present invention are a group of embodiments based on a single unique invention from the background. The aspects of the present disclosure are those of the group of embodiments based on a single invention. Configurations of the present disclosure can have aspects of the present disclosure. As a solution according to present invention, embodiments of the present invention have aspects described below. These aspects may be combined together, and the combinations can exert synergistic effects. The aspects can also be combined with features of the embodiments, and the combinations can exert synergistic effects. The features of the embodiments may be combined together, and the combinations can exert synergistic effects.

A first aspect of the present invention is an authentication medium that includes: a sheet-like laminate sheet; a first region that is formed on the laminate sheet and where first individual information is recorded; and a second region that is formed on the laminate sheet and has a hologram structure where second individual information associated with the first individual information is recorded.

A second aspect of the present invention is an authentication medium manufacturing method that includes: a step of acquiring first individual information; a step of generating second individual information associated with the first individual information; a step of recording the first individual information on a laminate sheet; and a step of forming a hologram structure where the second individual information is recorded on the laminate sheet.

A third aspect of the present invention is an authentication medium reading method for reading the authentication medium of the present invention.

This method includes: a step of acquiring condition information indicating a condition for reproducing second individual information on a hologram structure of the authentication medium; and a step of reproducing the second individual information by irradiating the hologram structure with light based on the condition information.

A fourth aspect of the present invention is an authentication medium verification method for determining authenticity of the authentication medium of the present invention.

This method includes: a step of reading first individual information recorded on the authentication medium; a step of reading second individual information recorded on a hologram structure of the authentication medium; and a step of determining authenticity of the authentication medium based on the read first individual information and second individual information.

Advantageous Effects of Invention

According to the embodiments of the present invention, it is possible to help deter tampering and counterfeiting in a simple configuration.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments An embodiment of the present invention will be described below with reference to FIGS. 1 to 20.

(Authentication Medium)

Figure 1:
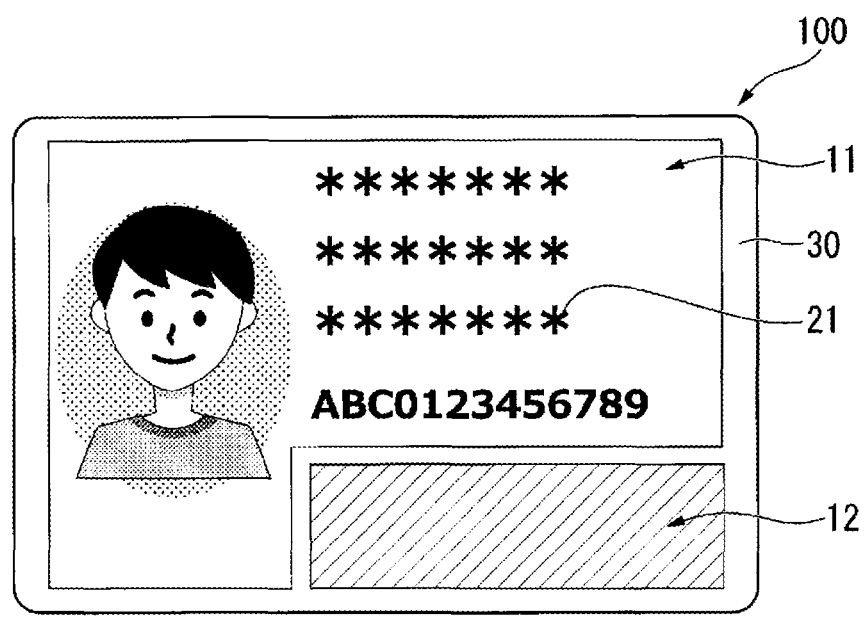
FIG. 1 is a plan view theoretically describing an authentication medium according to an embodiment of the present invention.

FIG. 1 is a plan view of an authentication medium 100 according to the present embodiment. The authentication medium 1 includes a sheet-like laminate sheet 30, and a first region 11 and a second region 12 formed on portions of the laminate sheet 30.

The authentication medium 100 may be a laminate. The laminate can be a card or a page. The laminate can be made by laminating a plurality of laminate sheets 30. The laminate sheet 30 can be a thermoplastic sheet. The material for the laminate sheet 30 can be polycarbonate or vinyl chloride. The laminate can be a sheet-like laminate of polycarbonate or a sheet-like laminate of vinyl chloride. The lamination can be thermal lamination. The card can be an ID card, a national ID card, a credit card, a driver's license card, a residence card, or the like. The page can be a data page of a passport. The thickness of the page can be 0.5 mm or more and 2.5 mm or less.

Personal identification information 21 of the authentication medium 100 is recorded in the first region 11. The personal identification information 21 can be the owner's personal identification information. The personal identification information can include information about the owner of the card or a booklet. The personal identification information is personal biometric information, personal non-biometric information, or a pair of them. The biometric information can be biometric information from which a person can be identified. The biometric information allows biometric authentication. Instances of non-biometric information include name, birth date, country of origin, place of origin, and personal identification number. These can be a combination of characters, numbers, symbols, and the like. Instances of personal biometric information include a facial image, fingerprint pattern, retina pattern, voice print, handwriting, and signature. The personal identification information 21 is configured to be visually recognizable under visible light such that identity of the person can be confirmed visually.

The material for the laminate sheet 30 can be a thermoplastic. The thermoplastic of the laminate sheet 30 can be a polycarbonate resin. The polycarbonate resin allows the personal identification information 21 to be recorded by laser engraving. The personal identification information 21 can be laser-printed by irradiating the laminate sheet 30 with laser light and carbonizing the polycarbonate resin with heat from the laser. The personal identification information 21 can be recorded by modulating a drawing position, drawing depth, drawing point, pulse width, pulse frequency, pulse energy, laser irradiation intensity, or laser irradiation time, or a combination thereof, depending on the personal identification information 21 to be recorded.

The method of recording the personal identification information 21 is not limited to laser engraving. Instead of laser engraving, the personal identification information 21 may be formed by printing on the laminate sheet 30. Alternatively, the personal identification information 21 may be printed on a resin sheet different from the laminate sheet 30, and the resin sheet may be attached to the laminate sheet 30 or embedded in a transparent laminate sheet.

When the personal identification information 21 is added to the surface or inside of the laminate sheet 30, if the authentication medium 100 is destroyed for the purpose of counterfeiting or imitation, the personal identification information 21 will also become corrupted, so that it can be detected that an act of forging or counterfeiting has been performed.

Figure 2A:
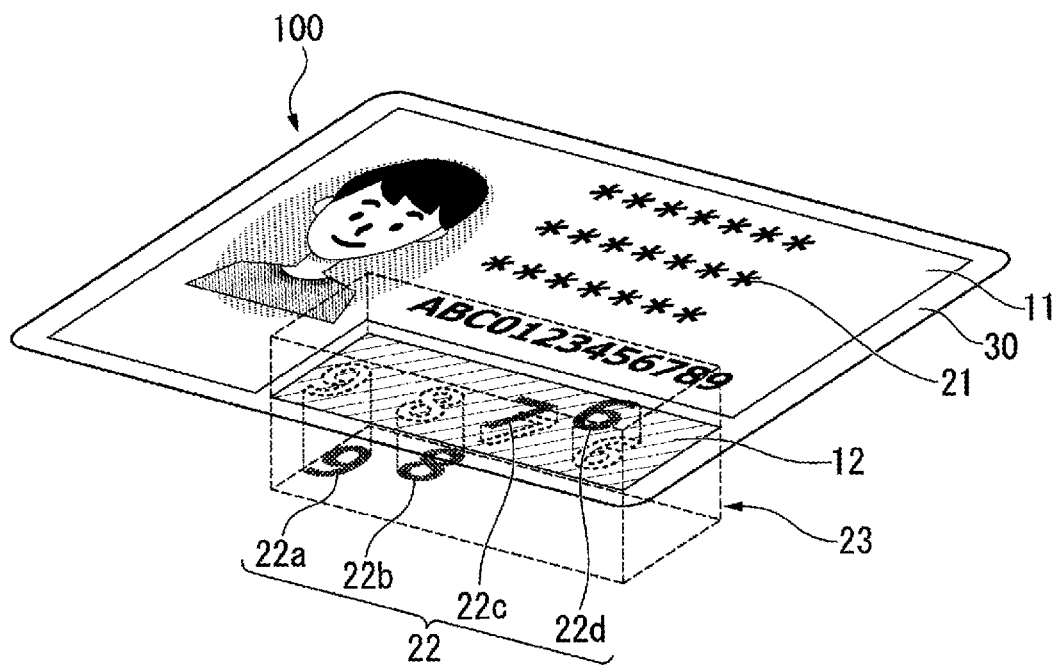
FIG. 2A is a perspective view of the authentication medium.

A hologram structure is formed in the second region 12. As shown in FIG. 2A, the hologram structure displays check data 22 generated from the personal identification information 21 as a reconstructed image. The check data 22 is recorded on the hologram structure.

With the check data 22 recorded, the hologram structure may be formed so as to overlap the region where the personal biometric information is recorded. That is, the hologram structure may be formed partially or in the entire region where the personal biometric information is recorded. In this case, in the event of the biometric information being tampered with, the hologram structure becomes corrupted so that the diversion of the hologram structure can be prevented. In this configuration, the check data 22 may be generated from the personal non-biometric information. This facilitates prevention of impersonation by which the personal non-biometric information such as national origin and the biometric information such as a facial image may be replaced with another person's information.

The check data 22 may be generated from only the personal non-biometric information. This allows the check data 22 to be provided more easily.

The check data 22 is provided from the personal identification information 21. The check data 22 can be provided by extracting a specific portion of the personal identification information 21 as data or by generating data using a predetermined algorithm from all or part of the personal identification information 21. Hash values may be obtained using a hash function from all or part of the personal biometric information and be set as the check data 22. Otherwise, hash values may be obtained using a hash function from all or part of only the personal biometric information and be set as the check data. This makes it possible to detect tampering of the biometric information by using the check data 22. In this configuration, the hologram structure with the check data 22 recorded thereon may be formed so as to overlap the region where the personal non-biometric information is recorded. That is, the hologram structure may be formed partially or in the entire region where the personal biometric information is recorded. This prevents impersonation in which the personal non-biometric information such as national origin and the biometric information such as a facial image is replaced with another person's information.

The check data 22 can be digital data. The digital data may be a single or multiple sets of the same numbers, alphabets, or characters in various languages as a part of the personal identification information 21. Otherwise, the digital data may be numbers, characters, or symbols that are obtained by converting all or some numbers or characters in the personal identification information 21 by using a function, matrix, or algorithm. The digital data may be recorded as a code on the hologram structure. The code can be a one-dimensional code or two-dimensional code. An instance of a one-dimensional code is a bar code. An instance of a two-dimensional code is a QR code (registered trademark) or a matrix code.

The check data 22 can be hash values of a part or all of the personal identification information 21. A simple hash function for generating the check data can be used to convert the characters and numbers included in the personal identification information into ASCII codes and form a number string, and divide the number string by a specific number string and set the resulting remainder as the check data. Otherwise, specific information included in the personal identification information (for example, a combination of the last two digits of the birth date and the characters of the first name, etc.) itself may be set as the check data. In this case, the size of the characters and numbers can be in the range of 10 µm or more and 300 µm or less. In this range, the check data can be made incapable of visual recognition by the naked eye. These characters can be microtext. The size of the characters and numbers can be in the range of 300 µm or more and 5 mm or less. In this range, the check data can be made capable of visual recognition by the naked eye.

The hash function for generating the hash values can be a cryptographic hash function. As such a cryptographic hash function, the Secure Hash Algorithm or a block cipher standardized by the US National Institute of Standards and Technology can be applied. Instances of the cryptographic hash function include MD5, SHA family, Whirlpool, RIPEMD, RadioGatun, bcrypt, and BLAKE2.

The information amount of the check data 22 is smaller than the information amount of the personal identification information 21. The bit number of the check data 22 can have a fixed length or a variable length. The bit number of the check data 22 can be in the range of one bit or more and 1024 bits or less, and may be in the range of two bits or more and 64 bits or less. In this range, the check data 22 can be handled more easily. When the number of bits of the check data 22 is variable, the number of bits of the check data 22 can take a value in accordance with the level of security required for the authentication medium. Since the hologram structure itself has security, one bit or two bits of check data may be sufficient in some cases. In addition, the number of bits may be small when the number of issued authentication media is small, and the bit number may be sequentially increased with an increase in the volume of issuance. By doing so, when residence cards are applied as the authentication media, for example, it is possible to sequentially enhance the security in accordance with the number of registered foreigners. That is, it is possible to achieve scalable security.

Various publicly known structures are applicable to the hologram structure in the second region 12. Among them, a volume hologram in which the refractive index in a formative layer is modulated and a surface-relief hologram with a relief on its surface are suitable for the hologram structure. The volume hologram can be a Lippmann hologram. The surface-relief hologram can be a computer-generated hologram. The computer-generated hologram can be a kinoform. The computer-generated hologram is a hologram formed by computing a diffraction grating hologram pattern from a reconstructed image. A kinoform is obtained by recording a phase on a kinoform of a reconstructed image to be recorded on the kinoform, as a phase difference on the surface of the kinoform. A Lippmann hologram or a computer-generated hologram on which optical phase information is recorded can be formed as a hologram film. A part of the hologram film on which optical phase information for display of a reconstructed image is recorded can be transferred to a fixed position on a card or a page. This allows the reconstructed image of the check data 22 to be reproduced at a position with accuracy.

The hologram structure in the second region 12 can be formed from a Lippmann volume hologram by irradiating a light-responsive photopolymer with object light from the preset check data and reference light for reproducing the object light and then recording its interference fringes on the photopolymer. Alternatively, the Lippmann volume hologram may be formed by computing in advance optical phase information of object light from the check data such that the optical phase information is set as spatial distribution of a phase difference in a spatial light phase modulator and that light having passed through or reflected on the spatial optical phase modulator is set as object light. The material for the volume hologram can be a photopolymer of which the refractive index is modulated by photosensitizing. The type of the photopolymer can be a photo-crosslinking type or a photopolymerized type. An instance of the photo-crosslinking type has polyvinyl carbazole as the main component. The photopolymerized type is highly sensitive due to a chain reaction during photosensitization. With the photo-crosslinking type, it is easy to produce a large difference in refractive index. The photopolymerized type can be a wet type requiring development or a dry type not requiring development. A dry-type photopolymer can have a pair of low-compatibility materials with different refractive indexes as the main components. An instance of the pair of main components is a pair of a vinyl acetate compound and an acrylic acid ester compound, or a pair of an epoxy compound and an acrylic acid ester compound, either of which may be a polymer. A photopolymer having a vinyl acetate compound and an acrylic acid ester compound as the pair of main components can easily produce a difference in refractive index. A photopolymer having an epoxy compound and an acrylic acid ester compound as the pair of main components can easily enhance durability. An instance of the wet type is a mixture of polyvinyl pyrrolidone and a monomer. This mixture has portions with low light intensity that dissolve in the developer and leaves voids, and thus can easily produce a large difference in refractive index. A volume hologram can be replicated by irradiating a master hologram with a laser, and exposing the photopolymer to interference fringes of the reflected light (object light) and the irradiating laser light (reference light) to modulate the refractive index of the photopolymer. (Contact copy method)

The hologram structure in the second region 12 can be formed from a surface-relief hologram using the procedure described below. Optical phase information for forming the preset check data is specified. The optical phase information is recorded on a resist plate as the depth of a fine concavo-convex structure by a laser lithography system or an electron beam lithography system, or using an ion beam lithographic method. An embossed stamper is manufactured by electroforming with a resist plate as a master. A film is embossed and replicated using this embossed stamper having the fine concavo-convex structure as a cylinder mold, thereby obtaining the hologram film. The film to be embossed may have a carrier and a relief layer of a thermoplastic resin and a curable resin on the carrier. The carrier may be a plastic film. The plastic film can be a PET film, a PP film, or a PE film. The carrier can have a thickness of 15 μm or more and 200 μm or less.

The surface-relief hologram has a relief surface. The relief surface has a surface relief with concave portions or convex portions, or concave portions and convex portions, and exhibits optical properties such as diffraction, light reflection suppression, isotropic or anisotropic light scattering, refraction, polarized and wavelength-selective reflection, transmission, and light reflection suppression. When the relief layer is provided with a diffraction grating structure region having a pitch of 0.5 μm or more and 2 μm or less and a depth of 0.05 μm or more and 0.5 μm or less, for instance, the hologram exhibits the property of diffracting light. When the relief layer is provided with a moth-eye structure or a deep grating structure having a pitch of 0.1 μm or more and 0.5 μm or less and a depth of 0.25 μm or more and 0.75 μm or less, for instance, the surface-relief hologram exhibits the properties of suppressing light reflection, polarized and wavelength-selective reflection, transmission, and light reflection suppression. When the surface-relief hologram is provided with, for instance, an acyclic line- or dot-shaped repetitive structure region having an average pitch of 0.5 μm or more and 3 μm or less and a depth of 0.05 μm or more and 0.5 μm or less, the surface-relief hologram exhibits the property of emitting isotropic or anisotropic scattered light. When the surface-relief hologram is provided with a structure region having an average pitch of larger than 3 μm and a depth of larger than 0.5 μm and is made different in refractive index from the adjacent layer, the surface-relief hologram exhibits the property of refraction. The optical properties of the hologram structure can be perceived and sensed by visual inspection and mechanical detection. This improves anti-counterfeiting/tampering performance and appearance.

The hologram structure may have a plurality of hologram structure regions. The hologram structure region can display a single image or a combination of plural images. The image can represent a single piece of text or a code, or a combination thereof. The code can be a one-dimensional code or two-dimensional code. Instances of the one-dimensional code include a bar code, a serial number, or a combination thereof. Instances of the two dimensional code include a QR code and a matrix code.

In order to improve the luminance of diffraction light generated by the fine concave-convex structure formed on the hologram film, the fine concave-convex structure on the hologram film may be covered with a reflective layer. That is, the hologram structure may be covered with a reflective layer. The reflective layer can cover the fine concave-convex structure by vapor-phase deposition on the concave-convex structure. The vapor-phase deposition can be chemical vapor-phase deposition or physical vapor-phase deposition. As the physical vapor-phase deposition, vacuum vapor deposition or sputtering can be applied. The material for the reflective layer can be metal oxide, metal, or silicon oxide. The metal oxide can a metal sulfide, metal oxide, metal nitride or metal fluoride.

Instances of the metal sulfide include zinc sulfide. Instances of the metal oxide include titanium oxide, aluminum oxide, and zirconia. Instances of the metal nitride include titanium nitride. Instances of the metal fluoride include calcium fluoride and magnesium fluoride. The metal can be aluminum (Al), silver (Ag), chromium (Cr), or nickel (Ni). Alternatively, the metal can be an alloy of them. The reflective layer improves the luminance of a reconstructed image of the hologram structure. Specifically, the reflective layer increases the luminance of the check data 22 displayed as a reconstructed image by the hologram structure. This makes the authentication medium easier to verify. The verification can be performed using an observation method and a verification method described later. The reflective layer can have a thickness of 10 nm or more and 500 nm or less. With a thickness of 10 nm or more, it is easy to enhance the ease of determining the authentication medium. With a thickness of 500 nm or less, it is easy to deposit the reflective layer.

The inorganic-material reflective layer can be formed by a wet coating technique such as a sol-gel process as well as the above-mentioned dry coating technique. The hologram structure may further have an adhesive layer. The material for the adhesive layer can be acryl, polyester, urethane, or a composite, mixture, or copolymer thereof. The adhesive layer may contain powder. The powder can be inorganic powder or polymer powder. The adhesive layer may contain a plurality of kinds of powder. There may be an anchor layer between the adhesive layer and the hologram structure. The material for the anchor layer can be acryl, urethane, or a composite, mixture, or copolymer thereof. The adhesive layer can be arranged on one or both surfaces of the hologram structure.

Figure 2B:
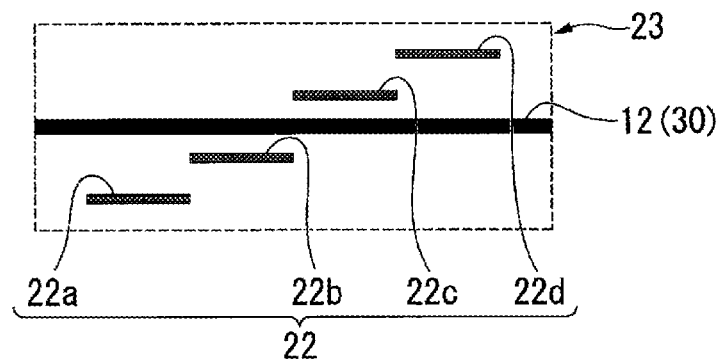
FIG. 2B is a diagram theoretically describing reconstructed images in a second region of the authentication medium.

In an example according to the present embodiment, the check data 22 having four numbers "9", "8", "7", and "6" as information segments is displayed in space 23 displaying the check data 22. Therefore, the hologram structure with the four information segments 9, 8, 7, and 6 as reconstructed images is formed in the second region 12. The hologram structure has a hologram segment where the four information segments are reproduced. Further, the hologram structure can be configured, as shown in FIG. 2B, such that respective reconstructed images 22a, 22b, 22c, and 22d of the information segments are arranged at different positions in the thickness direction of the authentication medium 100 (hereinafter, called "reproduction positions"). That is, the reconstructed images 22a and 22b can be reproduced under the laminate sheet 30 where the second region 12 is located, and the reconstructed images 22c and 22d can be reproduced above the laminate sheet 30.

The reproduction positions of the information segments may constitute a part of the check data 22. For example, when codes 1, 2, 3, and 4 are respectively added to the reproduction positions of the reconstructed images 22a, 22b, 22c, and 22d, the check data 22 represented by the reconstructed images shown in FIGS. 2A and 2B can be expressed as "98761234" or "91827364". That is, the check data 22 represented by the reconstructed images can be a string of numbers, a string of letters, or a string of combined numbers and characters.

(Method of Manufacturing the Authentication Medium)

Next, a method of manufacturing the authentication medium 100 of the present embodiment will be described. Known configurations of components may be used in the authentication medium 100. Thus, publicly known methods may be used in the manufacture of the authentication medium. The authentication medium 100 is characterized by individual information contained therein. Therefore, the following description will focus on the procedure relating to individual information.

The authentication medium 100 containing the individual information can be a license card, an ID card, or the like. That is, the personal identification information formed in each authentication medium 100 may be different.

Figure 3:
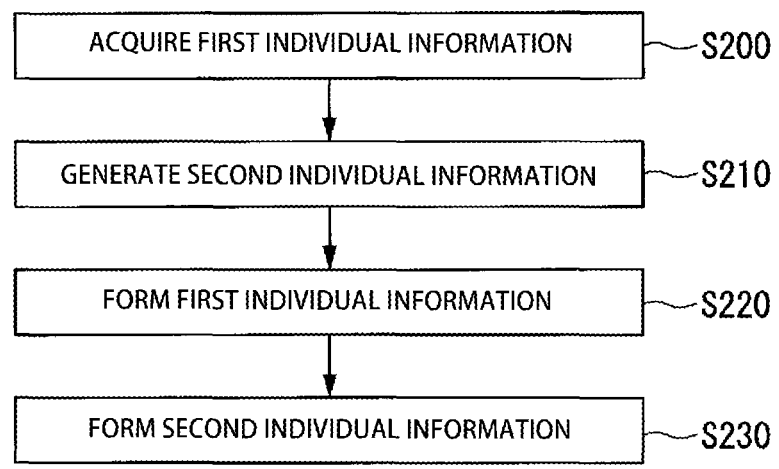
FIG. 3 is a flowchart showing a method of manufacturing the authentication medium according to the embodiment.

FIG. 3 is a flowchart of a procedure for forming individual information to be added to the authentication medium 100.

First, the personal identification information 21 is acquired in step S200. In step S200, typically, but not limited to this, the personal identification information 21 is acquired from an application document or an entry form on the web completed by the owner to whom the authentication medium 100 is to be issued.

Subsequently, in step S210, the check data 22 is generated based on the personal identification information 21 acquired in step S200. In step S210, hash values are obtained by a hash function from a part or all of the personal identification information 21 and are set as check data.

The check data may be generated by using a simple hash function. The simple hash function for generating the check data can be used to convert the characters and numbers included in the personal identification information into ASCII codes and form a number string, and divide the number string by a specific number string and set the resulting remainder as the check data. Otherwise, specific information included in the personal identification information (for example, a combination of the last two digits of the birth date and the characters of the first name, etc.) itself may be set as the check data.

The hash function can be a cryptographic hash function. As such a cryptographic hash function, the Secure Hash Algorithm standardized by the US National Institute of Standards and Technology can be applied. The cryptographic hash function can be a block cipher. Instances of the cryptographic hash function include MD5, SHA family, Whirlpool, RIPEMD, RadioGatun, bcrypt, and BLAKE2.

Upon completion of step S210, all the individual information to be added to the authentication medium 100 is prepared. The personal identification information 21 acquired in step S200 and the check data 22 acquired in step S210 are associated with each other in a replicable manner by the processing performed in step S210.

Subsequently, in step S220, the personal identification information 21 is formed in the first region 11 of the laminate sheet 30. The formation method can be any of the various methods described above. Forming the personal identification information 21 by laser on the surface of the laminate sheet 30 makes it hard to counterfeit the authentication medium 100.

The laser can be a pulsed laser. A pulsed laser is easy to adjust in power by varying its repetition rate. The pulsed laser can be a solid-state laser. Instances of the solid-state laser include a YVO4 laser and a YAG laser. The repetition rate of the pulsed laser can be from continuous wave (CW) to 1 MHz or less. The pulse width of the pulsed laser can be 100 microseconds to 100 femtoseconds. The personal identification information 21 can be recorded by carbonizing a part of the laminate sheet 30 using a laser. Alternatively, the personal identification information 21 can be recorded by printing with ink on the laminate sheet 30 and discoloring the ink by laser. The ink can be fluorescent ink or infrared absorbing ink. The fluorescent ink or the infrared absorbing ink can be a dye ink or a pigment ink. The fluorescent ink or the infrared absorption ink is an invisible ink. Invisible inks allow formation of a latent image. In other words, discoloring a part of the invisible ink makes it possible to form a latent image of the personal identification information 21 using a laser. This further improves anti-counterfeiting properties. An instance of a visible ink is an optically variable ink. The optically variable ink can be a magnetic ink. The optically variable magnetic ink makes it possible to form a characteristic pattern using a magnetic field. This prevents counterfeiting because it is hard to imitate a characteristic pattern formed by such a magnetic field.

Subsequently, in step S230, the hologram structures with the check data 22 as reconstructed images are formed in the second region 12 of the laminate sheet 30. The hologram structures can be formed by selectively transferring information segments matching the check data from the hologram film on which the information segments are recorded in advance.

Figure 4A:
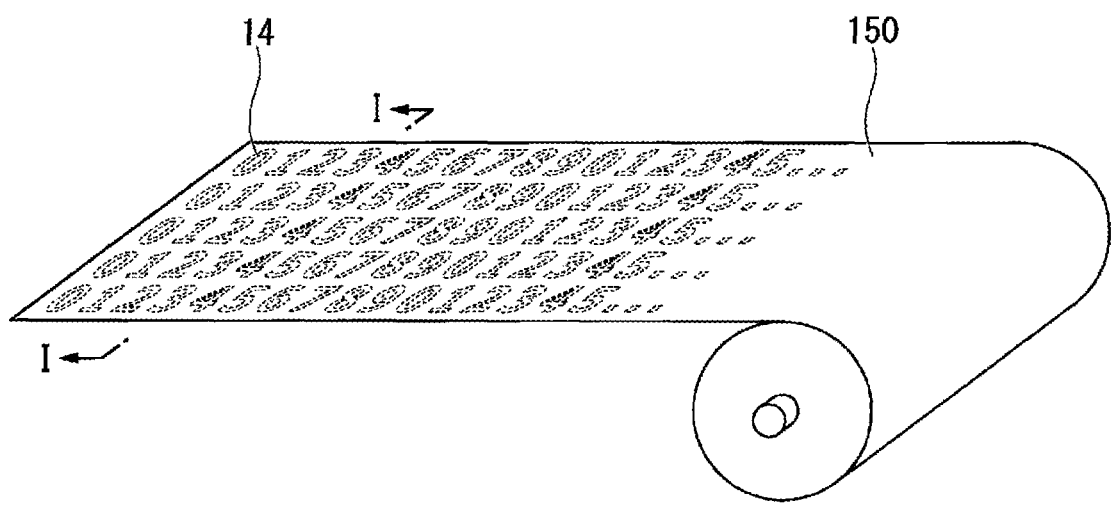
FIG. 4A is a perspective view conceptually explaining concepts of a hologram film for use in an embodiment of the present invention.
Figure 4B:
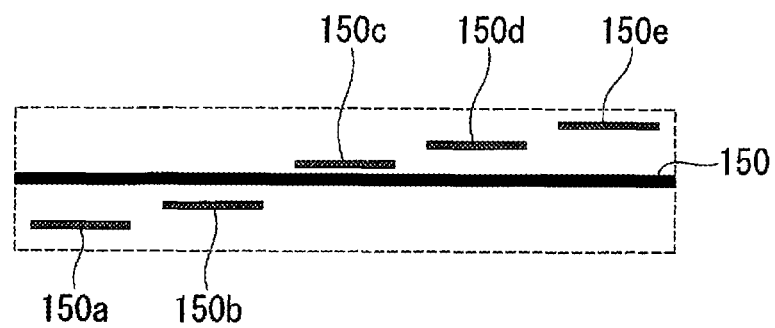
FIG. 4B is a cross-sectional view taken along line of FIG. 4A, which conceptually explaining concepts of the positions of the reconstructed images.

When the check data is formed of only Arabic numbers, the information segments of the check data are the ten digits 0 to 9. Therefore, as shown in FIG. 4A, a hologram film (hologram structure group) 150 in which a large number of hologram structures, having ten digits as regularly formed reconstructed images, is used, and only the digits required are sequentially arranged in the second region 12. That is, the hologram film has a plurality of hologram structures. FIG. 4B is a cross-sectional view of FIG. 4A taken along line I-I. The five hologram structures of the same digits aligned in the same line have respective different reproduction positions 150a, 150b, 150c, 150d, and 150e. It is therefore possible to accommodate any of the reproduction positions that might be set for the digits in the check data.

Instead of the hologram film 150, ten types of hologram films may be used, each having a different respective digit repeated in the hologram structures as the reconstructed images are formed.

FIGS. 4A and 4B show the hologram film 150 with only Arabic numbers. Alternatively, the hologram film 150 may have character information. Instances of the character information include alphabetic characters and Greek characters.

To selectively transfer specific information segments to the second region, methods using a thermal head or a laser can be applied. The selective transfer can be performed by forming an adhesive layer on the back surface of the hologram film 150 and melting the adhesive layer only at the parts of the information segments to be transferred by the heat of the thermal head or the heat of the laser.

Alternatively, the selective transfer may be performed by providing an adhesive layer already exhibiting adhesion properties on the back surface of the hologram film 150 and then removing by laser the adhesive layer only from the region that is not a transfer target.

The method of forming the check data is not limited to those using a hologram film described above. The hologram structures may be formed by forming the generated check data on an intermediate transfer foil and attaching or laminating the foil to the second region 12. Alternatively, the hologram structures with the check data 22 as reconstructed images may be formed inside the laminate sheet 30 by making portions of the laminate sheet transparent, and then causing material modification corresponding to the optical phase information of the generated check data, inside of the transparent portions, by a pulsed laser.

FIGS. 4A and 4B show an example of the hologram film 150 on which only the information segments for forming the check data are formed. Alternatively, the hologram film 150 may be provided with a printed guide pattern for alignment during attachment of the information segments to the second region 12 or an intermediate transfer foil film. The guide pattern may be formed by a hologram structure. Instance of guide patterns are rectangles, crosses, circles, triangles, polygons, and combinations thereof.

According to the method of manufacturing the authentication medium in the present embodiment, the order of steps S200 to S230 described above can be changed unless a contradiction occurs between them. The following changes are possible:

Reversing the order of steps S220 and S230. In this case, the second region may partially overlap the first region.
In this case, a track of recording the personal identification information 21 is left on the hologram structures as well, which prevents tampering by hologram replacement.

Performing step S220 before step S210.

The hologram structure may be embedded in an ID card.

In the present embodiment, in order to embed the hologram structures for reproducing the check data in the authentication medium, the hologram structure is first transferred to the laminate sheet 30. The transfer can be done using a metallic or resin stamper. In this transfer process, as conditions for transferring the hologram structures, the surface temperature of the press surface of the stamper can be set to 80° C. or more and 150° C. or less, the time during which the hologram structure is kept in contact with a transfer target can be set to 0.1 seconds or more and 3 seconds or less, and the transfer pressure can be set to 100 kg/cm$^2$ or more and 500 kg/cm$^2$ or less.

After that, a transparent cover layer is laminated on one surface of the laminate sheet 30 with the hologram structure transferred thereto. The material for the cover layer can be a thermoplastic. Since a thermoplastic becomes softened by heat, the cover layer is pressed against the laminate sheet 30 and the hologram structures, and they are merged by hot pressing. The merge makes it possible to cover the one surface of the laminate sheet and coat the hologram structures. In this process, the temperature of the heat source can be set to 170° C. or more and 200° C. or less, and the time during which the heat source is kept in contact with these components can be set to one minute or more and 30 minutes or less.

(Method of Reading the Authentication Medium)

Next, a method of reading the authentication medium of the present embodiment manufactured as stated above will be described.

Of the individual information recorded on the authentication medium 100, the personal identification information 21 can be read by a publicly known reading device. This device can be a line scanner. The personal identification information 21 can be read using a publicly known reading device by irradiating with light of a predetermined wavelength from a predetermined angle. However, since the check data 22 is recorded as reconstructed images of the hologram structures, the check data 22 cannot be correctly reproduced unless the check data 22 is irradiated with light of a predetermined wavelength that is the reference light of the hologram structures from a predetermined angle. For example, if the check data 22 is irradiated with light of a wavelength different from the reference light, the reconstructed images are displayed but their reproduction positions are shifted from the correct positions. In addition, for example, if the authentication medium is irradiated with light from an angle different from the predetermined angle, the reconstructed images are displayed but formed at positions displaced from the positions read by a camera or an optical sensor.

Therefore, in the method of reading the authentication medium of the present embodiment, condition information indicating conditions for reading the check data is acquired (step A), the second region is irradiated with light of a predetermined wavelength at a predetermined angle based on the condition information (step B), and the check data is read (step C).

There is no particular limitation on the mode of acquiring the condition information in step A. Instances of the mode of acquiring the condition information in step A include a mode in which the condition information is included in advance in the personal identification information 21 and then the condition information is acquired during reading of the personal identification information 21, a mode in which the provider of the authentication medium provides the condition information to the reading user in advance, and the like. In the latter case, the provider of the authentication medium may manufacture the authentication media while regularly changing the condition information, and provide the user with the condition information in association with the time of manufacture (which is generally synonymous with the time of issuance to the owner). In the former case, the changed condition information is included in a part of the personal identification information in real time, which saves the time and effort to provide the condition information to the reading user. The condition information may be processed and included in the personal identification information. The process may be encryption.

(Method of Verifying the Authentication Medium)

Next, a method of verifying the authentication medium according to the present embodiment will be described.

Figure 5:
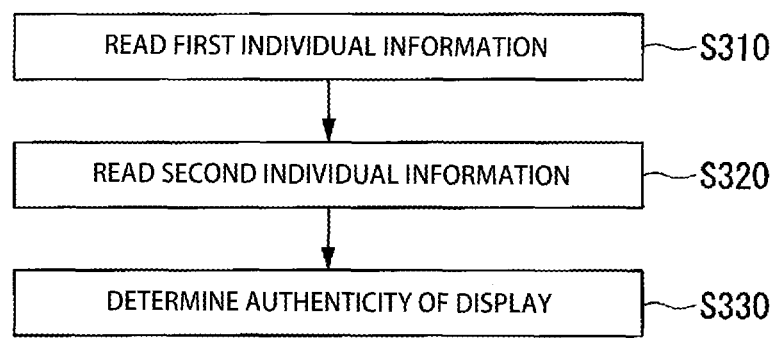
FIG. 5 is a flowchart describing a method of verifying the authentication medium according to the embodiment.

FIG. 5 is a flowchart showing a flow of the method of verifying the authentication medium according to the present embodiment.

First, in step S310, the personal identification information 21 in the first region 11 is read. Subsequently, in step S320, the check data 22 in the second region 12 is read. Steps S310 and S320 may be performed by the method of reading the authentication medium described above.

Subsequently, in step S330, it is determined whether the check data 22 acquired in step S320 corresponds to the personal identification information 21 acquired in step S310, thereby determining the authenticity of the authentication medium 100.

Some instances of step S330 will be listed below.

a. The personal identification information and the check data are collated to verify that they are consistent. When a part of the personal identification information itself constitutes the check data, the check data and the part of the personal identification information constituting the check data can be collated and verified.

b. The personal identification information 21 and the check data 22 are verified from a database in which they are stored. The database may be within the reader of the authentication medium or may be located on a server or cloud on the internet.

c. The personal identification information 21 acquired in step S310 is converted by a conversion method for generating check data to generate check data for collation, and the generated check data for collation and the check data 22 acquired in step S320 are collated with each other.

d. The check data 22 acquired in step S320 is converted in a reversed procedure of the conversion method for generating second individual information, to generate personal identification information for collation, and the generated personal identification information for collation and the personal identification information 21 acquired in step S310 are collated with each other. This mode is applicable to the case where the check data has been generated in a mode capable of reverse conversion.

Examples c and d are advantageous in that there is no need to construct a separate database for collation, which may become very large in size.

In the verification method according to the present embodiment, the order of step S310 and step S320 may be reversed.

(Reader)

The reader applied to the present embodiment can be a reader that includes a device to read the personal identification information and a component to read the check data such as a camera or an optical sensor. The device to read the personal identification information can be a line scanner.

As described above, the authentication medium 100 of the present embodiment is hard to counterfeit because it includes the personal identification information 21 and the check data 22 associated with the personal identification information 21. That is, even if a counterfeiter tampers only with the personal identification information 21, there is an association between the tampered personal identification information and the check data 22 so that the counterfeiting can be detected by the collation between the personal identification information and the check data. Further, without knowing how the check data is generated, the check data corresponding to rewritten personal identification information cannot be specified, and thus counterfeiting of the check data is effectively impossible.

Therefore, the security of the authentication medium 100 is higher than other media with a hologram transfer foil on which a shape or pattern not associated with the personal identification information is recorded.

In addition, the check data 22 has a plurality of reproduction positions of the information segments, which ensures variety of the check data even if the number of information segments is small. For example, when the check data is formed of three digits, there are 1000 possible combinations of the numbers. However, presetting five individual reproduction positions for these numbers would create 125,000 possible combinations, that is, over a hundred times the previous number of combinations.

Further, setting the difference between the reproduction positions to be small to a degree that the reconstructed image cannot be easily recognized by visual inspection (for example, 1 mm or less) makes the check data more difficult to counterfeit because it is less likely that counterfeiters will recognize that a plurality of reproduction positions have been used.

According to the method of manufacturing the authentication medium of the present embodiment, it is possible to mass-produce the authentication medium 100 with different check data 22 by recording check data varying in accordance with the personal identification information in the hologram structures in the second region 12.

According to the method of reading the authentication medium of the present embodiment, it is possible to reliably read the check data using the condition information acquired in step A. In the method of reading the authentication medium of the present embodiment, the authentication medium with condition information included in the personal identification information is used to allow the acquisition of the personal identification information and condition information at the same time, thereby improving convenience to the user.

According to the verification method of the present embodiment, the authenticity of the authentication medium is determined based on the personal identification information 21 and the check data 22 recorded on the authentication medium 100, which makes it possible to detect counterfeited authentication media easily and reliably.

Next, experimental results of the present invention will be described.

Experimental Examples

Hologram structures were calculated such that a computer-generated hologram reproduces uppercase alphabet characters "A", "B", and "C" at positions 5 mm, 7 mm, and 9 mm, respectively, from the front side with reference to a hologram film interface, and then a hologram transfer foil with the hologram structures embossed thereon was produced. The reference light was green light.

The produced hologram transfer foil was transferred onto a polycarbonate sheet. Another polycarbonate sheet was overlaid on the former polycarbonate sheet and was subjected to thermal lamination to produce a laminate sheet with the hologram structures embedded therein.

Two pieces 53.98 mm long and 85.6 mm wide of the foregoing laminate sheet were prepared (in conformity with international standard ISO/IEC7810 ID-1 that prescribes identification card size), and the information on a fictitious person A was recorded as personal identification information on one of the two (experimental example 1). The information on a fictitious person B was recorded as personal identification information on the other (experimental example 2). Each personal identification information was recorded on the surface of the laminate sheet using an infrared laser with a wavelength of 1064 nm.

A reader including a full-color LED light source, an optical prism, and a CMOS sensor was prepared. When the authentication medium was set on the reader, the light emitted from the light source vertically entered the authentication medium, and the reconstructed images of the hologram structures were formed on the CMOS sensor. Only the reconstructed images at the corresponding reproduction positions can be selectively acquired by changing the installation position (imaging condition) of the CMOS sensor.

When the authentication media of experimental examples 1 and 2 were irradiated with green light, the reconstructed images "A", "B", and "C" were reproduced at the positions 5 mm, 7 mm, and 9 mm, respectively, on the front side of the hologram transfer foil interface.

When the authentication media of experimental examples 1 and 2 were irradiated with red light, the reconstructed images "A", "B", and "C" were reproduced at the positions 3 mm, 5 mm, and 7 mm, respectively, on the front side of the hologram transfer foil interface. That is, the reproduction positions of the hologram structures varied depending on the wavelength of the light emitted from the light source.

When the conditions for verification are "green light, 7 mm from the front side", the check data in the experimental examples is "B". That is, the reconstructed images "A" and "C" are dummy reconstructed images not constituting check data. When the conditions for reading by the reader (the emission light wavelength and the installation position of the CMOS sensor) coincide with the condition information, the reader acquires only the correct check data "B". When the reading conditions are different from the condition information, the reader cannot acquire the correct check data. For example, when the reading conditions are "red light, 7 mm from the front side", the reader acquires only the reconstructed image "C". When the reading conditions are "green light, 3 mm from the front side", the reader cannot acquire any reconstructed image.

When a person attempting to counterfeit or tamper with the object visually checks the authentication medium of each experimental example, they can visually recognize all the reconstructed images "A", "B", and "C". Thus, a person attempting to counterfeit or tamper with the object cannot know whether the reconstructed images "A", "B", and "C" are all check data or only some of them are check data. Even if a person knows some of the conditions (for example, the reference light is green light), all the reconstructed images "A", "B", and "C" are visually recognizable under green light and thus it is not possible to correctly counterfeit or tamper with the check data without the information on the reproduction positions which are part of the verification conditions.

As stated above, each authentication medium of the present invention is highly resistant to counterfeiting and tampering, whereas the check data can be easily acquired from the authentication medium by a reader and verified only if the correct condition information is known.

These conditions are changeable. For example, when the conditions are "green light, 7 mm and 9 mm from the front side", the check data is "B and C". When the conditions are "green light, 7 mm from the front side, and red light, 3 mm from the front side", the check data is "A and B". In this manner, the conditions may include reference light information, reproduction positions, or both.

Embodiments and experimental examples have been described in detail so far with reference to the drawings. However, specific configurations are not limited to these embodiments and experiments. The configurations of embodiments of the present invention can be changed or combined. The combinations of embodiments can produce synergetic effects. Some modifications will be shown below, but other modifications are also possible. Two or more of these modifications may be combined.

The check data may not include a plurality of reproduction positions. That is, the information segments in the check data may have reconstructed images reproduced at the same height.

The personal identification information and the check data may be formed on different surfaces of the laminate sheet. For instance, the personal identification information may be recorded on the front surface of the laminate sheet, and the check data may be formed on the back surface of the laminate sheet. In this configuration, in the event of damage in counterfeiting or imitation of the authentication medium, either the personal identification information or the check data will be affected. Therefore, the authentication medium can be easily verified.

Figure 6:
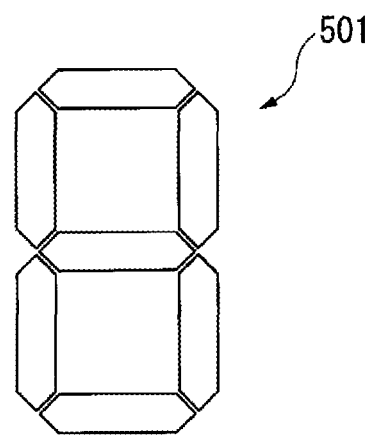
FIG. 6 is a diagram showing an example of a hologram structure.
Figure 7:
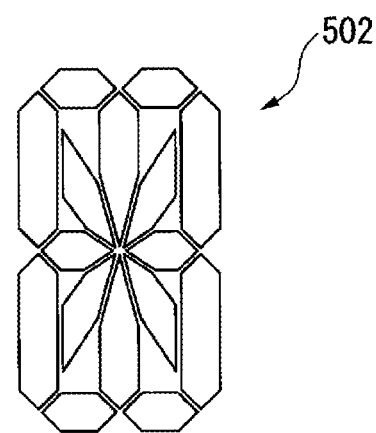
FIG. 7 is a diagram showing an example of a hologram structure.

The hologram structure described above may have a shape 501 displaying a symbol using seven segments (7-segment display) as shown in FIG. 6 or may have a shape 502 displaying a symbol using 16 segments (16-segment display) as shown in FIG. 7. That is, the hologram structure may be a combination of multiple holographic segments. In this case, the reflective layer can be removed (demetallized) from the hologram structure regions corresponding to the holographic segments in accordance with the numbers or characters to be displayed, thereby easily making the reconstructed images of the hologram structures responsive to the number, character, or symbol information to be recorded. The number of holographic segments is not limited to the ones described above. The hologram structure may have a 14-segment display shape.

FIGS. 6 and 7 show each segment as a structural unit has a polygonal shape, but each segment may have a shape with corners rounded. FIGS. 6 and 7 show gaps between the segments, but these gaps may not be provided. In the case of providing gaps, all the gaps may be identical or different in dimension. For example, the part where two segments are adjacent appears to be dark in the reconstructed image and thus the distance between these segments is shortened, whereas the part where three segments are adjacent appears to be bright in the reconstructed image and thus the distance among these segments is lengthened, whereby the reconstructed images can be optimized.

When there is no gap between the segments, the reflective layer may be partially removed in the adjacent unit cell regions, but this reconstructed image has little effect on the appearance of the reconstructed images.

Each of the segments shown in FIGS. 6 and 7 may be formed of a plurality of dot-like segments. There are no limitations on the number and shape of the segments as far as the numbers, characters, or symbols recorded on the hologram structures can be visually recognized as reconstructed images. The reflective layer can be partially removed from the hologram structures, and a code can be recorded in these parts. In this case, the hologram structures may have holographic segments. Each holographic segment, as a one-bit segment, can have a 0 or 1 recorded as data, depending on the presence or absence of the reflective layer. Specifically, the holographic segment with the reflective layer can have a 1 as data, and the holographic segment from which the reflective layer has been removed can have a 0 as data. Conversely, the holographic segment with the reflective layer can be set to 0, and the holographic segment from which the reflective layer has been removed can have a 1 as data. Otherwise, the code may be recorded depending on the presence or absence of the reflective layer, not in conjunction with the hologram structures. In this case, when the reflective layer is to be removed from the hologram structures by laser, the relative positions of the removal positions and the hologram structures may be only approximately determined.

Figure 8:
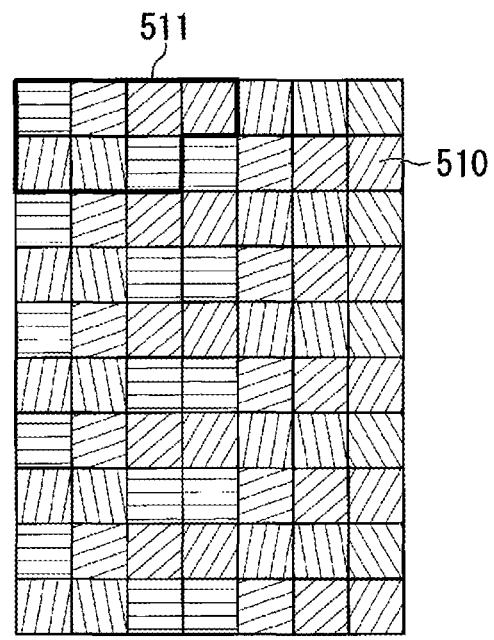
FIG. 8 is a diagram showing an example of a hologram structure formed from a plurality of unit cell regions.
Figure 9:
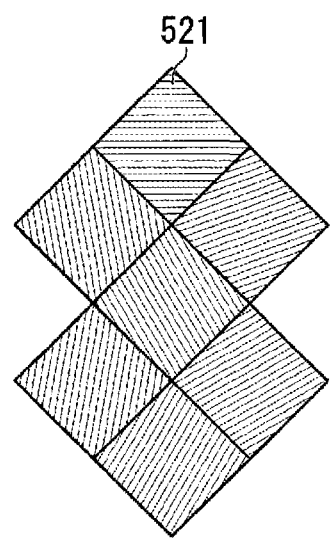
FIG. 9 is a diagram showing an example of a hologram structure formed from a plurality of unit cell regions.

FIGS. 8 and 9 each show an example of hologram structure arrangement where a reconstructed image of a hologram structure is formed of seven segments. Referring to FIG. 8, a plurality of unit cell regions arranged in a two-dimensional matrix is set as one segment. A segment 511 shown in FIG. 8 is formed of seven unit cell regions 520. The entire hologram structure can have an outer shape of a square as shown in FIG. 8 by arranging the segments without a gap therebetween while changing the shape of each segment and the number of unit cell regions.

Each unit cell region 520 can have one side of 20 μm or more and 300 μm or less. The size of the unit cell region 520 can be a size of a square circumscribing a unit cell region 520. This makes each unit cell region hard to observe by visual inspection.

FIG. 9 shows an example in which each segment is formed of one unit cell region 521. The unit cell region shown in FIG. 9 is larger than the unit cell region shown in FIG. 8. In this example, alignment during demetallization becomes easy.

The size of the unit cell region 521 can be 100 μm or more and 300 μm or less, for instance. The size of the unit cell region 521 can be the size of a square circumscribing the unit cell region 521. The unit cell region may have a size capable of visual recognition. When the unit cell region is large, forming the reflective layer from a light-permeable, highly refractive material makes it hard to recognize the removal of the reflective layer by visual inspection, thereby improving the appearance.

Figure 10:
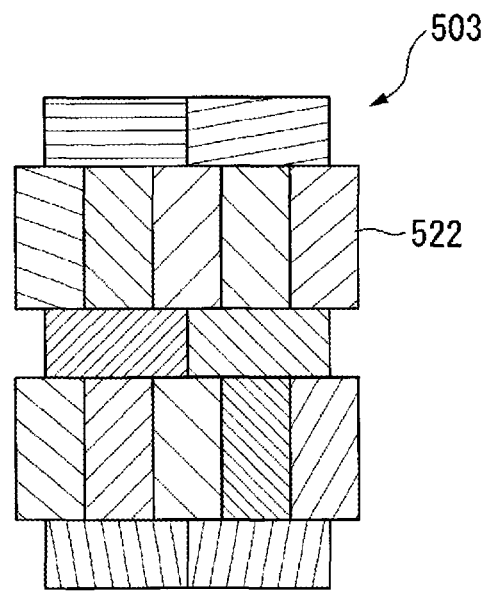
FIG. 10 is a diagram showing an example of a hologram structure formed from a plurality of unit cell regions.

As another example, FIG. 10 shows an arrangement example of unit cell regions 522 in a hologram structure 503 corresponding to a 16-segment display shape.

A plurality of holographic segments may be arranged with a gap left therebetween. When a plurality of holographic segments are arranged without a gap therebetween, there can exist a region where minute hologram structures constituting the holographic segments are mixed to obscure the boundaries between the holographic segments.

Figure 11:
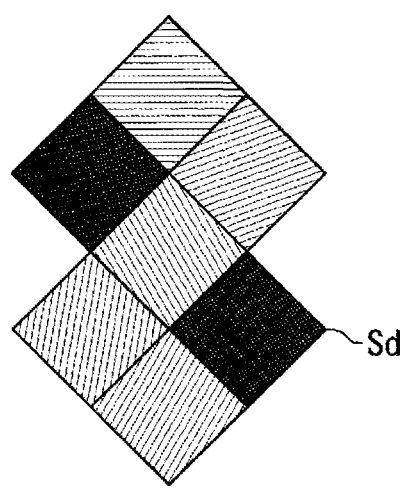
FIG. 11 is a diagram showing an example of a hologram structure from which a reflective layer is omitted.
Figure 12:
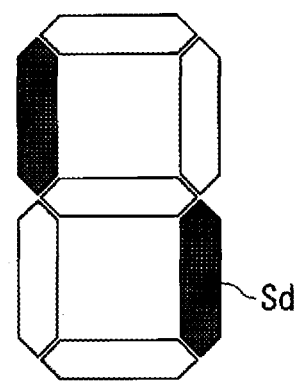
FIG. 12 is a diagram showing an example of a hologram structure from which a reflective layer is omitted.

In the shape 501 shown in FIG. 6 or the shape shown in FIG. 9, when the reflective layer is not removed from any of the segments, the segments are visually recognized as number "8". As shown in FIGS. 11 and 12, removing the reflective layer from predetermined segments Sd by demetallization allows the segments to be visually recognized as number "2". In this way, removing the reflective layer from unit cell regions constituting a predetermined segment makes it possible to form a reconstructed image on demand.

The reflective layer may be fully removed from the segments to be subjected to demetallization. In this case, it is easy to enhance the visual recognition of the check data 22 displayed by the hologram structure. Otherwise, only a part of the reflective layer may be removed. In this case, it is easy to improve the speed of recording the check data 22 on the hologram structure. Even in this case, demetallization can be performed to such a degree that the difference in brightness between the segments having undergone demetallization and the segments not having undergone demetallization can be visually recognized. In the case of removing only a part of the reflective layer, the removed region may form a linear pattern, characters, numbers, a fine pattern, or a geometric pattern. In this case, authenticity verification can be performed by checking whether the removed region forms a predetermined pattern by observation under magnification.

Figure 13:
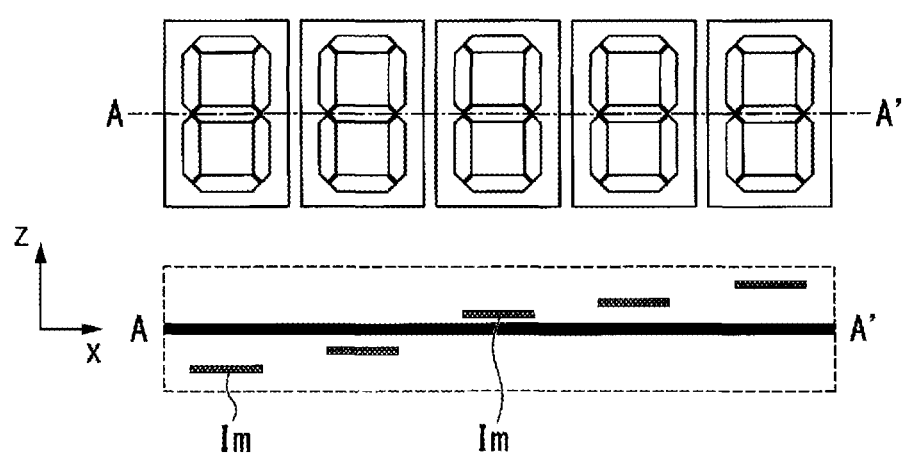
FIG. 13 is a diagram showing a hologram structure and reproduction positions of reconstructed images.
Figure 14:
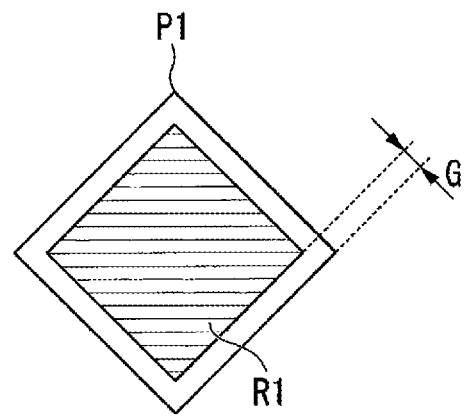
FIG. 14 is a diagram showing an example of a hologram structure area in a unit cell region.

As shown in FIG. 13, reconstructed images Im may be reproduced at different positions among a plurality of hologram structures (see the cross-sectional view on the bottom). In this case, the reproduction positions can be added as information as well as the numbers or characters formed on demand. As a result, a large quantity of information can be added on demand.

The reproduction positions of the reconstructed images may be varied regularly. Further, the reproduction positions of the reconstructed images may be varied monotonically. The monotonic varying in the reproduction positions can be monotonic separation from or approach to the hologram structures. This monotonic varying in the reproduction positions makes it easy to detect the replacement of the positions in the hologram structures. In the example of FIG. 13, a shift to become gradually shallower in depth from left to right among the reproduction positions can be seen. On the other hand, the reproduction positions may be varied at random in a non-monotonic manner. The non-monotonic varies in the reproduction positions can be regular varying or random varying. In one hologram structure, the segments may be reproduced at different positions.

One demetallization method is laser ablation. In removal (ablation) of the reflective layer using a laser, the condensing diameter of the laser and a distance G between the outer edge of a region R1 where a computer-generated hologram structure is formed in each unit cell region and an outer edge P1 of the unit cell region (see FIG. 14) contribute to the accuracy of alignment during ablation.

Figure 15:
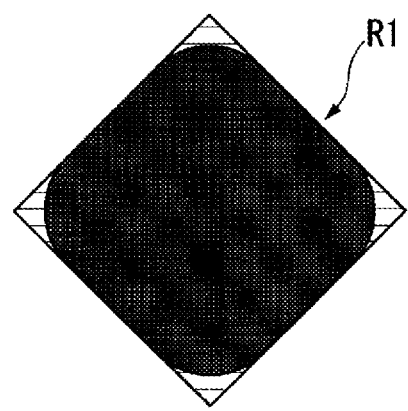
FIG. 15 is a diagram showing an example of a hologram structure region from which a reflective layer is not completely omitted.

At the time of laser ablation, since the laser is condensed and applied, the removed area is circular in shape. Therefore, when the distance G is short, the reflective layer is not fully removed from the region R1 but is left at the four corners as shown in FIG. 15. From the viewpoint of preventing this phenomenon, the distance G can be made identical to or greater than the laser spot diameter. Further, the distance G may be twice as large as the condensing diameter. Moreover, the distance G may be 100 times or less as large as the condensing diameter of the laser.

Alignment marks may be provided to increase the accuracy of alignment during laser ablation. The alignment marks can be formed by a hologram, a diffraction grating pattern, or printing.

The pattern width of the reflective layer to be removed by laser ablation can be in the range of 1 µm or more and 100 µm or less. A pattern width of 1 µm increases the resolution of the hologram structure displaying information. A pattern width to 100 µm or less enhances the ease of laser processing.

The intensity of light from a reproduction light source for reproducing each segment may be uniform in the entire segment or may be different among the parts of the segment. Increasing the intensity of light from the reproduction light source at the central part of each segment and decreasing the intensity of light from the reproduction light source at the peripheral part of each segment obscures the boundary between adjacent segments and suppresses a reduction in the quality of the reconstructed image that might be caused by the demetallization of the reflective layer. In contrast, decreasing the intensity of light from the reproduction light source at the central part of each segment and increasing the intensity of light from the reproduction light source at the peripheral part of each segment makes it possible to enhance the visual recognition of the segments.

The density of light from the reproduction light source may be varied continuously or intermittently.

Figure 16:
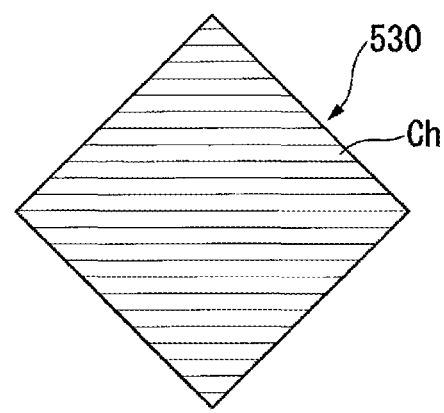
FIG. 16 is a diagram showing an example of a hologram structure area in a unit cell region.

The area where a hologram structure is to be provided in a unit cell region can be set in accordance with the reconstructed image. As shown in FIG. 16, providing a hologram structure Ch in an entire unit cell region 530 makes the reconstructed image brightest. On the other hand, when the authentication medium is observed from a certain angle, a part of the segment may appear to be lost depending on the reproduction position of the reconstructed image, particularly a reproduction position along the thickness direction of the authentication medium.

Figure 17:
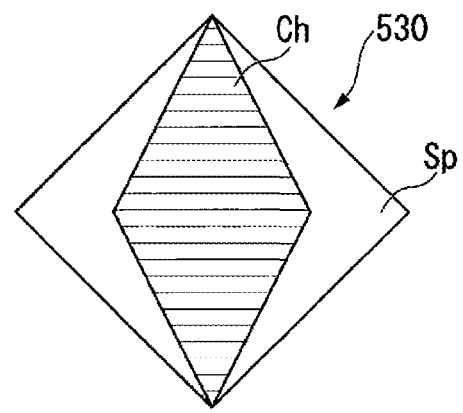
FIG. 17 is a diagram showing an example of a hologram structure area in a unit cell region.
Figure 18:
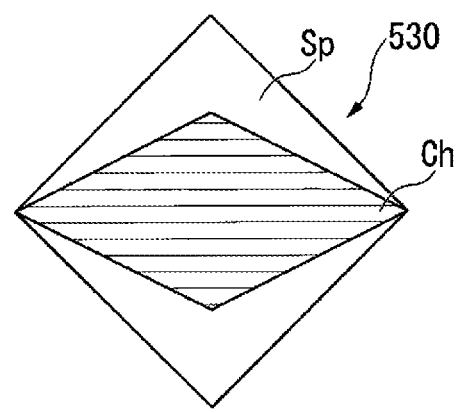
FIG. 18 is a diagram showing an example of a hologram structure area in a unit cell region.
Figure 19:
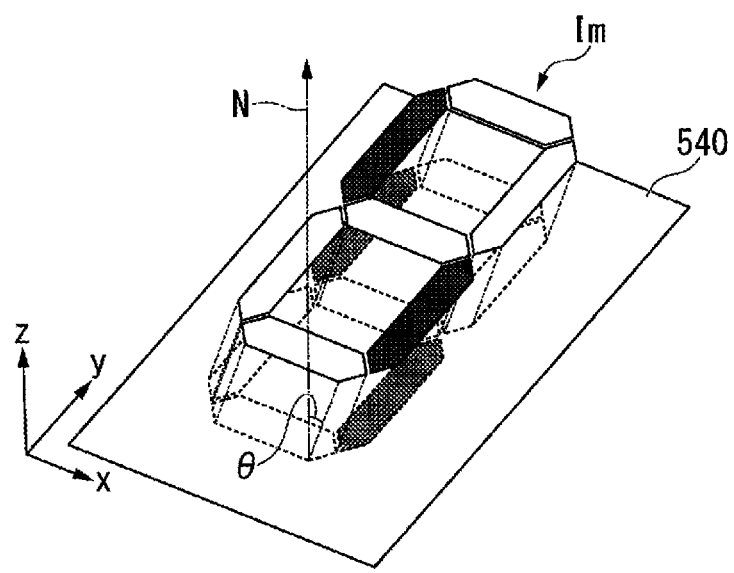
FIG. 19 is a diagram showing an example of positional relationship between a hologram structure and a reproduction position of a reconstructed image.

Forming a void area without a hologram structure at both horizontal sides of the unit cell region 530 as shown in FIG. 17 or forming a void area Sp at both vertical sides in the unit cell region 530 as shown in FIG. 18 makes it possible to control the viewing angles in the reconstructed image in the vertical and horizontal directions and suppress the reconstructed image of the holographic segment from appearing to be partially lost at some observation angles.

The void regions Sp may be formed by demetallization of the reflective layer.

The reflective layer can be formed from a metallic material, metal oxide, metal sulfide, or a combination of them. Forming the reflective layer from these materials increases the reflectance from the hologram structure and makes the reconstructed image brighter. In particular, with the reflective layer formed from a transparent metal oxide or metal sulfide, the authentication medium can be used in fields in which transparent authentication media such as personal authentication cards are required.

The reflective layer can be formed from a metal oxide or metal sulfide with the property of absorbing a laser wavelength to be used so that the metal oxide or metal sulfide can be removed by laser abrasion. Otherwise, laser abrasion can be performed even on a metal oxide or metal sulfide without the property of absorbing that laser wavelength, by applying specific wavelength absorbing ink near the reflective layer. The laser for laser abrasion can be a solid-state laser. Instances of the solid-state laser include a YVO4 laser (with a wavelength of 1064 nm) and a YAG laser (with a wavelength of 1064 nm). In this case, as the specific wavelength absorbing ink, infrared absorbing ink may be applied near the reflective layer. This facilitates improvement of the scanning speed of the laser.

In the case of using a metallic material for the reflective layer, a fine concavo-convex structure of the hologram film with a fine concavo-convex structure formed thereon may be partially covered with the reflective layer of the metallic material. The reflective layer may be wire-like patterned. The wire-like pattern may be a mesh-like pattern. By partially covering the fine concave-convex structure with the reflective layer of the metallic material, the information printed on the personal authentication card covered with the fine concave-convex structure can be visually recognized without being concealed by the authentication medium. At the same time, patterning by laser ablation is possible because the partially remaining metallic material absorbs the laser light. The mesh structural scale can be in the range of 10 µm or more and 300 µm or less, more specifically in the range of 10 µm or more and 100 µm or less. Within this range, the presence of the metallic material can be made hard to recognize during visual inspection and observation.

The reproduction position of a reconstructed image may be varied in a direction other than the depth direction described above. In the example shown in FIG. 19, a reconstructed image Im is reproduced at a position separated from a hologram structure 540 not in a normal direction to the hologram structure 540 but in a direction at an angle θ formed with respect to a normal N. As a result, the reconstructed image Im is shifted upward (in a y-axis positive direction shown in FIG. 19) from the hologram structure 540.

By appropriately shifting the reproduction position, the reconstructed image Im can be easily observed and the visibility is improved. The shift direction is not limited to the upward direction but can be set to the downward direction, the horizontal direction (x-axis direction in FIG. 19), or a diagonal direction. The amount of the shift can also be set.

Figure 20:
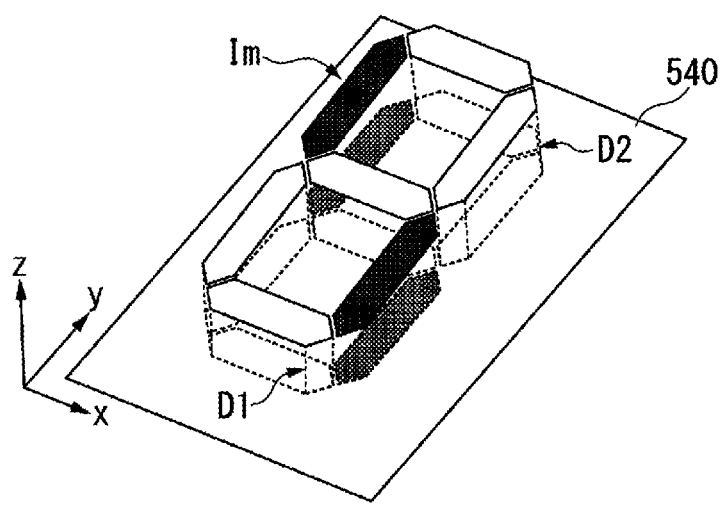
FIG. 20 is a diagram showing an example of positional relationship between a hologram structure and a reproduction position of a reconstructed image.

In the example shown in FIG. 20, a reconstructed image and a hologram structure are non-parallel to each other. That is, a distance D1 between the reconstructed image Im and the hologram structure 540 at the lower end of the reconstructed image Im is shorter than a distance D2 between the reconstructed image Im and the hologram structure 540 at the upper end of the reconstructed image Im, so that the distance between the reconstructed image Im and the hologram structure 540 gradually becomes longer toward the upper end. Changing the distance between the reconstructed image and the hologram structure at each part of the reconstructed image makes it possible to add dynamic motion to the reconstructed image and facilitate visual recognition by the user. The direction and amount of change in the distance can be within specific ranges.

The information regarding the reproduction position can be favorably used as key information for offline authentication by visual inspection.

Embodiments of the present invention have been described so far with reference to the drawings. However, specific configurations of the present invention are not limited to these embodiments. The present invention can include designs within the scope of the present invention and all embodiments that produce effects equivalent to those of the present invention.

Furthermore, the scope of the present disclosure should not be limited to the features of the invention defined by the claims, but should also include all the disclosed features and all the combinations of the features.

The terms "part", "element", "region", "segment", "unit", "printed matter", and "article" used in the present disclosure denote physical existence. Physical existence can refer to a substantial form or a spatial form surrounded by objects. The physical existence can be a structure. The structure may have specific functions. A combination of structures having specific functions can produce synergistic effects by a combination of the functions of the structures.

The terms used in the present disclosure and, particularly, in the claims (for example, the text of the claims) are generally intended as "open" terms (for example, the term "have" should be interpreted as "at least have", and the term "include" should be interpreted as "include, but not be limited to", or the like).

The terms, configurations, features, aspects, and embodiments should be interpreted with reference to the drawings as necessary. Matters that can be directly and unambiguously derived from the drawings should provide the basis of amendment as the text of the specification does.

If the introduction of a specific number in the claims is intended, such an intention will be clearly specified in the claims. If there is not such a specification, the intention does not exist. For example, for the sake of clarity, the appended claims can use introductory phrases, such as "at least one" or "one or more", in the claim recitation. However, the use of such phrases should not be construed to imply that the introduction of a claim recitation by the indefinite articles "a" or "an" limits any particular claim containing such claim to embodiments containing only one such recitation. The introductory phrase "one or more" or "at least one" and the indefinite article "a" or "an" (e.g., "a" and/or "an") should be at least interpreted as meaning "at least one or more." That is, "one" or "one or more"). The same applies to the use of definite articles, which are used for introduction of claim recitation.

INDUSTRIAL APPLICABILITY

The present invention is applicable to authentication media.

REFERENCE SIGNS LIST

11 . . . First region; 12 . . . Second region; 21 . . . Personal identification information; 22 . . . Check data; 22a, 22b, 22c, 22d . . . Reconstructed image; 23 . . . Space; 30 . . . Laminate sheet; 100 . . . Authentication medium; 150 . . . Hologram film (hologram structure group).

What is claimed is:

1. An authentication medium, comprising:
a sheet-like laminate sheet;
a first region that is formed on the laminate sheet and in which personal identification information is recorded; and
a second region that is formed on the laminate sheet and has a hologram structure in which check data associated with the personal identification information is recorded, wherein the check data has a plurality of information segments, and the hologram structure is a combination of a plurality of hologram segments that reproduces the plurality of information segments and wherein respective reconstructed images of information segments of the plurality of information segments are arranged at different positions in a thickness direction of the authentication medium.

2. The authentication medium of claim 1, wherein the check data is hash data of the personal identification information.

3. The authentication medium of claim 1, wherein the check data is formed from a part of the personal identification information.

4. The authentication medium of claim 1, wherein the second region overlaps all or part of the first region in a planar view of the authentication medium.

5. The authentication medium of claim 1, wherein the personal identification information is formed on a surface of the laminate sheet.

6. The authentication medium of claim 1, wherein at least one of the personal identification information and the hologram structure is formed inside the laminate sheet.

7. A method of reading the authentication medium of claim 1, comprising:
a step of acquiring condition information indicating a condition for reproducing the check data from the hologram structure of the authentication medium; and
a step of irradiating the hologram structure with light based on the condition information, to thereby reproduce the check data.

8. The authentication medium reading method of claim 7, further comprising a step of reading the personal identification information recorded on the authentication medium, wherein the personal identification information includes the condition information.

9. An method of verifying authenticity of the authentication medium of claim 1, comprising:
a step of reading the personal identification information recorded on the authentication medium;
a step of reading the check data recorded on the hologram structure of the authentication medium; and
a step of determining the authenticity of the authentication medium, based on the read personal identification information and the read check data.

10. The authentication medium verification method of claim 9, wherein the authenticity of the authentication medium is determined based on the read personal identification information, the read check data, and a reproduction position of the check data.

11. The authentication medium of claim 1, wherein a reconstructed image of each information segment of the plurality of information segments is arranged at a position in the thickness direction of the authentication medium, which is different than a position in the thickness direction of the authentication medium of a reconstructed image of any other information segment of the plurality of information segments.

12. The authentication medium of claim 1, wherein respective reconstructed images of information segments of the plurality of information segments include a first reconstructed image of a first information segment of the plurality of information segments and a second reconstructed image of a second information segment of the plurality of information segments, wherein the first reconstructed image is reproduced under the laminate sheet in the thickness direction of the authentication medium and the second reconstructed image is reproduced above the laminate sheet in the thickness direction of the authentication medium.

13. An authentication medium manufacturing method, comprising:
a step of acquiring personal identification information;
a step of generating check data associated with the personal identification information, based on the personal identification information;

a step of selecting a hologram segment representing at least a part of the check data, from a hologram structure group; and a step of transferring the selected hologram structure onto a laminate sheet, wherein the check data has a plurality of information segments, and the hologram structure is a combination of a plurality of hologram segments that reproduces the plurality of information segments and wherein respective reconstructed images of information segments of the plurality of information segments are arranged at different positions in a thickness direction of the authentication medium.

14. The authentication medium manufacturing method of claim 13, wherein the check data has a plurality of information segments, and the hologram structure is a combination of a plurality of hologram segments that reproduces the plurality of information segments.

* * * * *